Oct. 5, 1948.                C. R. SACCHINI ET AL                2,450,692
                              MOTION CONVERTER MECHANISM
Filed March 22, 1943                                              2 Sheets-Sheet 1
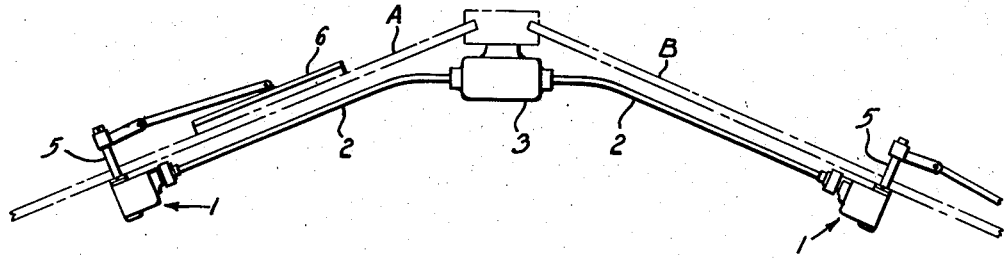
Fig.-1
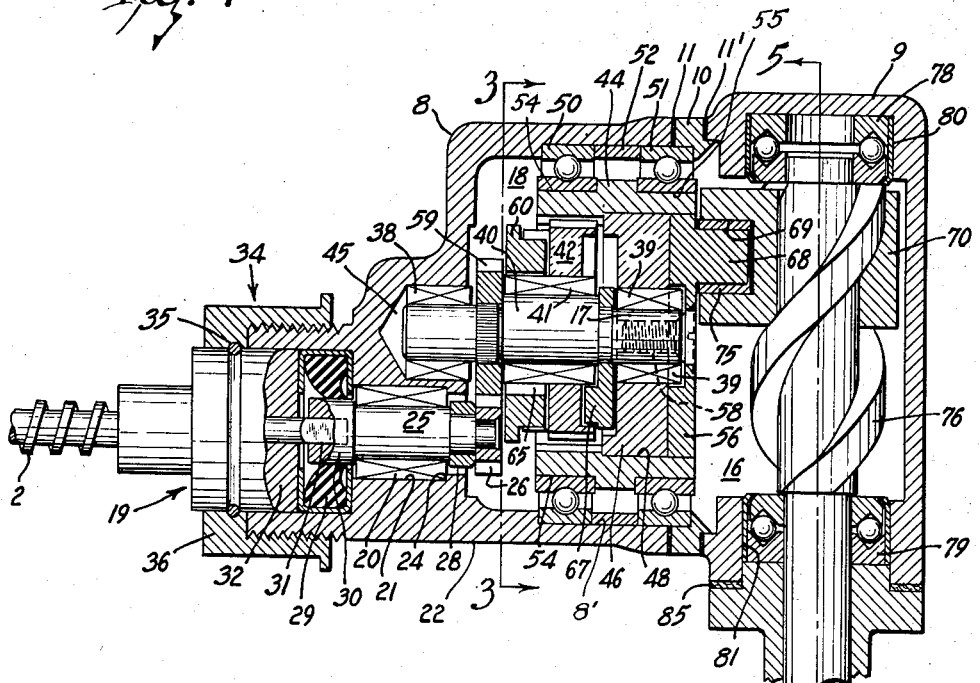
Fig.-2
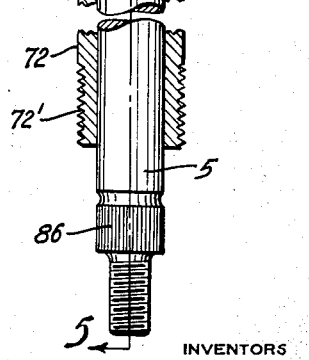
INVENTORS
COLUMBUS R. SACCHINI
LORAIN N. VANDERVOORT
BY George M. Soule
ATTORNEY Oct. 5, 1948.  C. R. SACCHINI ET AL  2,450,692
MOTION CONVERTER MECHANISM
Filed March 22, 1943  2 Sheets-Sheet 2
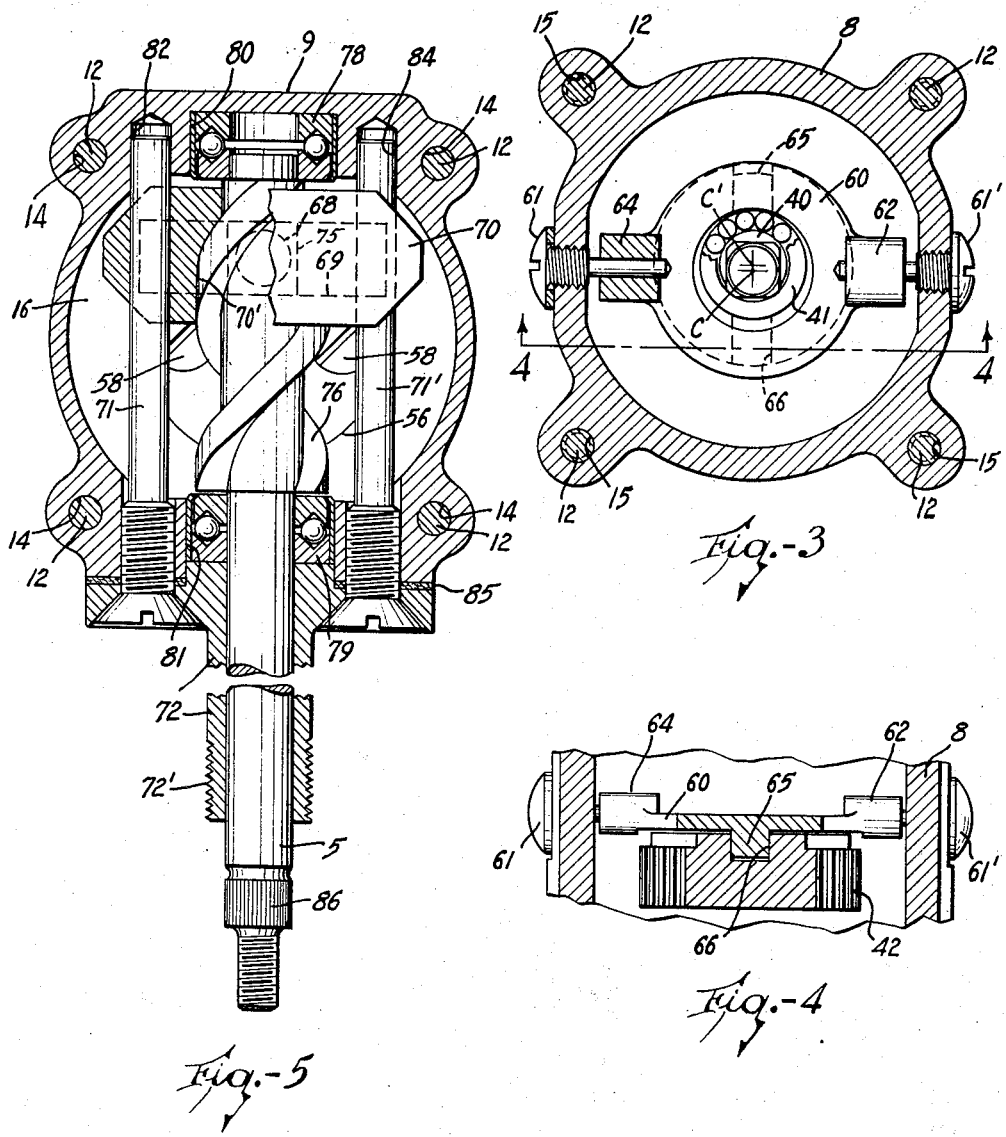
INVENTORS
COLUMBUS R. SACCHINI
LORAIN N. VANDERVOORT
BY
ATTORNEY Patented Oct. 5, 1948

2,450,692

UNITED STATES PATENT OFFICE 2,450,692

MOTION CONVERTER MECHANISM

Columbus R. Sacchini, Euclid, and Lorain N. Vandervoort, Cleveland, Ohio, assignors to The Marquette Metal Products Company, Cleveland, Ohio, a corporation of Ohio Application March 22, 1943, Serial No. 479,972

2 Claims. (Cl. 74—70)

This invention relates to motion converter units, that is: mechanisms for converting unidirectional rotary motion into alternate rotary or reciprocating motion and more particularly to such a motion converter unit which may be made small and compact although a high ratio exists between the input and output speeds and which nevertheless operates at high efficiency when used, for example, as the driving means for window and windshield wiper mechanisms on aircraft and other vehicles.

The general object of this invention is to provide an improved mechanism for converting high speed unidirectional motion into relatively slow speed reciprocating or alternate rotary motion.

In the cockpits or control cabins of both military and commercial types of airplanes, for example, the available room for mounting a motion converter unit for windshield wiper mechanisms is often very restricted, and consequently it is necessary that the unit be very small and compact. Furthermore, it is essential that it be possible to vary the extent of oscillation of the wiper blades without materially changing the construction of the motion converter unit in order to facilitate mass production and that provision be made for easily adjusting the angle of the reciprocating power output shaft with respect to the unidirectionally rotating power input shaft. In addition, a converter unit suitable for driving the windshield wipers of an airplane must provide adequate power at relatively slow speeds in order to enable the wiper arms to keep moving steadily under adverse conditions such as caused by accumulations of sleet and frost and due to high slip stream.

In many prior motion converter units designed to meet the foregoing requirements, a revolving crank pin drives a reciprocating crosshead or scotch yoke mechanism which, in turn, drives the wiper blade operating shaft through a suitable means for converting straight-line reciprocating motion into alternate rotary motion. In these known units part, if not all, of the speed reduction required between the prime mover and the crank pin is obtained by a driving worm and a driven worm wheel. Although such worm actuated mechanisms have received wide application, they are notably inefficient, the losses being manifested in heat which is generated principally by the inherent high friction between the worm and worm wheel. The heat cannot be readily dissipated from the small surface area of the unit, and consequently has resulted in overheating of the relatively moving parts which is particularly troublesome when the converter is made of the lighter non-magnetic metals as is frequently necessary when the unit is to be used on aircraft.

Other general objects of this invention include the provision of a motion converter unit for the purposes and of the above indicated type which unit: (a) meets all of the foregoing requirements without overheating although driven by a high speed prime mover, (b) has a high ratio between input and output speeds, (c) is extremely rugged although made very small in size and capable of operating for long periods without attention, (d) has the input and output shafts in planes at right angles to each other, (e) is easily adjusted as to the relative direction between the input and output shafts within these planes, (f) requires but the change of one part to adjust the extent of crank throw, (g) is so arranged that the essential working parts can be easily and quickly assembled and maintained in proper free working relationship, and (h) includes an improved means for converting straight-line reciprocating motion into alternate rotary motion.

More specific objects are to provide an improved motion converter unit in which (a) a speed reducing gear assembly comprises an eccentric driving means for an external gear cooperating with an annular internal gear, (b) a speed reducing annular gear train driven from a high speed power input shaft cooperating with a helically threaded power output shaft through a scotch yoke mechanism to drive the output shaft with slow speed alternate rotary motion and (c) a gear yoke constrains an external gear to move in a circular orbit to cause slow rotation of a cooperating internal gear.

Other objects and advantages of this invention will become apparent from the following description of a preferred form shown in the drawings, wherein:

Fig. 1 is a more or less diagrammatic small scale plan view showing one relative position of the converter unit of this invention with respect to a prime mover and a typical or illustrative airplane windshield structure; Fig. 2 is a central sectional view through the converter unit with the power take-off or output shaft in a position displaced 180° from the position indicated in Fig. 1; Fig. 3 is a sectional view taken generally at 3—3 in Fig. 2; Fig. 4 is a fragmentary sectional view taken generally at 4—4 in Fig. 3; and Fig. 5 is a sectional assembly view taken generally at 5—5 in Fig. 2.

Referring to Fig. 1, showing typical relatively convergent portions of two airplane windshield panels A and B, convenient mounting positions for a pair of the motion converter units 1 of this invention are at the top and near or at the center of these panels, respectively, so that the pair of units may be driven respectively through flexible torque shafts 2 from a suitable prime mover, such as a small high speed electric motor 3, having a pair of oppositely extending (e. g. flexible) rotary power shafts, and thereby oscillatably actuate, through output drive shafts 5, respectively, a pair of wiper blades 6 (one shown) in contact with the windshield panels. A single unit 1 may, of course, be used, with appropriate driving means, as a complete converter installation or more than two converter units may be driven by a common power source.

Many of the problems encountered in connection with installations on the order of that indicated in Fig. 1 are sufficiently well known in the art so as not to require detailed discussion here, some of which have been hereinbefore mentioned. For further example, numerous problems are presented by variations in aircraft construction, it being obviously desirable to make the mechanism as universally adaptable to the different constructions as possible. The relative direction of ingoing and outgoing shafting, on different jobs, may vary nearly through 360°. Considerable effective and positive power is required at the wiper blades; and, both from the standpoint of minimizing weight and enabling clear vision as well as from the standpoint of non-interference with other essential apparatus, the equipment must be relatively small and compact. Electric motors which serve as the prime movers are, most desirably, of small size and consequently are of the high speed type and must be placed as nearly out of the way as possible. The maximum speed of the wiper blades should be in the neighborhood of 200 cycles per minute in order to use relatively small, hence inherently high speed, driving motors considerable reduction in speed must be provided for between the motors and the wiper mechanism. Suitable speed reduction gearing must be accommodated within an extremely small space and heretofore, in most cases, sufficient speed reduction has not been attainable without deleterious heating of such gearing.

The casing or housing of the unit 1 may comprise a generally hollow body member 8 and a head body member 9, both preferably formed of cast aluminum, or the like, secured in cooperating position at a joint including an annular bearing-assembly-retainer 10 and a pair of gaskets 11 and 11' by appropriate means such as cap screws 12 (Figs. 3 and 5) passing through openings 14 equally spaced about the periphery of the head 9 into complementary tapped sockets 15 in the body member 8. The main function of the head 9 is to support an output shaft assembly 16, the output shaft 5 of which imparts its alternate rotary motion to the wiper blade 6 (Fig. 1) attached thereto. The equally spaced openings 14 and cooperating sockets 15, shown as four of each, are concentric with an eccentric shaft 17 forming a part of an annular speed-reducing gear assembly 18 contained within the body 8 so as to enable the head 9 to be mounted with respect to the body 8 in any one of four ninety-degree-displaced positions with the head 9 centered in relation to the gear assembly 18 thus enabling the output shaft assembly 16 to function properly in any of the four possible turned positions of the head 9 with respect to the body 8. Two different turned positions of the head 9 are illustrated in Figs. 1 and 2, respectively, and it is obvious that additional sockets 15 may be provided in the body 8 to enable the head 9 to be mounted selectively in more than four turned positions. When the head 9 is properly positioned and secured, the cap screws 12 may be locked by any suitable means such as a tie wire (not shown) inserted through holes in all of the screw heads as generally required in mechanisms used on aircraft.

In addition to the gear assembly 18 the body member 8 contains an input shaft assembly 19 which comprises a suitable self-contained antifriction (e. g. needle rollers) bearing assembly 20 slidably received within an opening 21 in a generally tubular lower extension 22 of the body 8 against an annular shoulder 24 formed by a reduced inner portion of the opening 21. The bearing 20 rotatably supports an input drive shaft 25 having a pinion 26 secured on a reduced inner end thereof as by an upsetting operation. An annular spacer or distance piece 28 surrounds the shaft 25 between the pinion 26 and the bearing 20 and a suitable oil seal assembly 29 engages an outer enlarged end portion 30 of the shaft 25 and fits tightly within a counterbored portion of the opening 21. The enlarged end portion 30 has an axial, non-circular socket 31 adapted to receive a complementary terminal part of one of the flexible torque shafts 2 or, if the mounting position permits, a similar part of one of the output shafts of the motor 3.

The oil seal assembly or structure 29 may be forced into proper position by abutment with a pilot sleeve portion 32 of a connector device 34 of one of the flexible torque shafts 2 and the sleeve 32 may be secured in position in the connector device 34 by a snap ring 35. An outer threaded collar 36 of the device 34 in which the ring 35 is seated is threaded on the tubular extension 22 and can turn on the pilot sleeve 32 in the manner of a pipe union nut.

The eccentric shaft 17 of the speed-reducing annular gear assembly 18 has its opposite collinear or axially aligned end portions rotatably supported in suitable antifriction bearing assemblies 38 and 39, respectively (e. g. similar to bearing 20) and has a central enlarged eccentric portion 40 riding in contact with the inner rollers of a suitable antifriction bearing assembly 41 (e. g. needle rollers), the outer periphery of which assembly (retainer shell for example) is supported in tight contact with the wall of a central opening in a gear or pinion 42 having external teeth arranged to mesh, in a manner to be described later, with an annular gear 44 having uniformly spaced internal teeth. The needle bearing roller assemblies 20, 38 and 41 are shown only diagrammatically on Fig. 2, for simplicity of illustration; but each assembly preferably comprises a shell-like retainer in which the needles are retained for free rolling operation by end flanges of the retainer shell, as well understood in the art.

The bearing assembly 38 occupies a socket 45 in an upper portion of the extension 22 and the bearing assembly 39 occupies a central opening in a bearing carrier 46 pressed into a non-tooth portion 48 of the annular gear 44. The bearing carrier 46 thus becomes in effect an integral part of the annular gear 44 which comprises a tube counterbored to receive the carrier 46 as clearly shown on Fig. 2.

The annular gear 44 is rotatably supported with respect to the body 8 by a pair of suitable antifriction bearing assemblies 50 and 51 (ball bearings as shown) pressed into an elongated shouldered recess 8' in the housing 8. The bearing assemblies 50 and 51 preferably are made so as to be capable of absorbing some end thrust, and are spaced apart by an annular distance piece 52, being locked in position by the retainer 10. The inner race members of the bearings are pressed over the outer periphery of the annular gear 44 in shouldered recesses 54 and 55, respectively.

A crank plate 56 may be attached to the bearing carrier 46 as by countersunk flat-headed screws 58. As thus described and as shown clearly in Fig. 2, the annular gear 44, the bearing carrier 46, and the crank plate 56 are arranged to rotate as a unit with respect to the housing 8, and the eccentric shaft 17 is arranged to rotate both with respect to the housing 8 and the bearing carrier 46.

The eccentric shaft 17 is rotatably driven from the input drive shaft 25 by means of a gear 59 in constant mesh with the pinion 26 and suitably secured to the shaft 17 between the bearing assembly 38 and the eccentric portion 40. An annular gear yoke 60 between the gear 59 and the internal gear 42 encircles but clears the bearing assembly 41 peripherally thereof as shown in Figs. 2 and 3, and is slidably supported at diametrically opposite sides by guide pins 61 and 61' (Figs. 3 and 4) which are screwed into tapped openings in the body 8 and slidably received within openings in lugs 62 and 64, respectively, of the gear yoke 60.

The purpose of the gear yoke 60 is to prevent rotation of the external gear 42 to which it is slidably keyed as by diametrically opposed integral tongue portions 65 extending at right angles to the openings in the lugs 62 and 64 and received within complementary diametrically opposed radial slots 66 in the gear 42 (Figs. 3 and 4). By virtue of this tongue and slot connection between the yoke 60 and the gear 42, and the fact that the bearing assembly 41 permits rotation of the shaft 17 with respect to the gear 42, the gear 42 moves in a circular orbit having a diameter equal to twice the eccentricity of the shaft 17. The eccentricity of the shaft 17 is indicated in Fig. 3 by the distance between the center C of the collinear end portions of the shaft 17 and the center C' of the portion 40. Movement of the gear 42 in its orbit drives the gear yoke 60 back and forth on its guide pins 61 and 61'.

The pinion or gear 42 is in constant mesh with the annular gear 44 which is consequently driven as a result of the translation or revolution of the external gear 42 in its orbit. Each time that the external gear 42 revolves once in its orbit, the annular internal gear 44 rotates, for example, a distance of two teeth, i. e. a distance equal to the diameter of the orbit on which the external gear revolves.

A suitable counterbalance 67 may be attached to the eccentric shaft 17 between the eccentric portion 40 and the bearing carrier 46 to compensate for the centrifugal influences of the portion 40 and associated eccentric parts when the shaft is driven at fairly high speed.

For operatively connecting the annular gear assembly 18 to the output drive shaft assembly 16, there is provided a crank pin 68 integral with the crank plate 56 and extending outwardly therefrom at a point displaced from the center of the crank plate into a throat slot 69 fully open at both ends and formed in a crosshead 70 slidably supported for to and fro motion as by a pair of guide pins 71 and 71'. The pins pass through openings near opposite ends of the crosshead 70 and also serve, in a manner to be described, as a securing means for a flanged bushing 72 constituting one journal member for the output drive shaft 5. Wear on the pin 68 and the slot 69 is avoided by the interdisposition of a bearing block 75 having a generally rectangular outer contour, as well known in scotch yoke mechanisms.

A helically threaded central opening 70' in the crosshead 70 cooperates with a helical threaded portion 76 of the shaft 5 to drive the shaft with an oscillating or alternate rotary motion when the crosshead 70 is moved to and fro in the direction of extent of the shaft 5 as a result of the revolution of the crank pin 68. The shaft 5 is rotatably supported in antifriction combined thrust bearing assemblies 78 and 79 pressed, respectively, into a socket 80 in one end of the head 9 (Fig. 5) and into an opening 81 in the opposite end of the head 9. The ends of the helically threaded portion 76 abut respectively against the bearing assemblies 78 and 79 and thus hold the shaft 5 in position.

The output drive shaft 5 extends outside of the head 9 through the flanged bushing or bearing sleeve 72 which is secured to the head 9 by head portions of the guide pins 71 and 71'. For this purpose, the guide pins pass through respective apertures in the bushing 72 and are threaded into tapped openings in the portion of the head 9 which is shown at the bottom of Fig. 5 and extend respectively into openings 82 and 84 in the portion of the head 9, shown at the top respectively.

In order to reduce machining tolerances and to eliminate excessive axial movement of the shaft 5, shims 85 may be placed between the bushing 72 and the head 9. The outer tubular portion of the bushing 72 is adapted to pass through the windshield frame of a vehicle such as an airplane and has its outer end threaded as at 72' to receive a retaining nut (not shown) whereby the unit 1 may be suitably retained in position, the shaft 5 having a splined or fluted portion 86 near its outer threaded end to receive a complementary part of a drive arm head section of the wiper blade driving assembly with which associated.

From the drawings and the foregoing description, it will be seen that the unit 1 has its output drive shaft 5 in a plane normal to the plane of the input drive shaft 25 which is of special advantage in many installations since a minimum of space is thereby required by the complete windshield wiping mechanism and the prime mover may be conveniently mounted as in a central position between two converters as shown.

In operation of the unit 1, the motor 3 drives the input drive shaft 25 at a high speed which, in turn, drives the eccentric shaft 17 through the pinion 26 and external gear 59 at a reduced speed which may conveniently be one-half of that of the shaft 25. Rotation of the eccentric shaft 17 causes translatory or orbital movement of the external gear or pinion 42 in a circular path such that each time the eccentric shaft 17 rotates once, the gear 42 completes one revolution about its orbit and thereby advances the gear 44 a short distance such as two or more tooth spaces in respect to the gear 44. The respective pitch diameters of the gears 42 and 44 may be so selected that a speed reduction of 25 to 1 is obtained therebetween, giving an overall speed reduction from the input shaft 25 to the crank pin 68 equal to 50 to 1. These named numerical values are purely for example and may be altered between reasonable limits as desired.

Rotation of the internal gear 44 causes the crank pin 68 to revolve and move the crosshead 70 to and fro on the guide pins 71 and 71'. By virtue of the helical thread connection between the crosshead 70 and the shaft 5, to and fro movement of the crosshead 70 causes the shaft 5 to move with an alternate rotary motion and thus oscillate the wiper blade 6 or other work performing member, as desired.

The extent of movement of the wiper blade 6 can be predetermined by selection of the off-center distance or eccentricity of the pins 68 with respect to the center of the crank plate 56. It is thus necessary only to change but one part of the complete unit 1 to alter the extent of wiper blade sweep, thus facilitating mass production economies since the units 1 might be used on different types of planes or other vehicles requiring various distances of wiper blade travel.

When assembled for use, the housing comprising the body 8 and head 9 is filled with a suitable lubricant which is adequately sealed at the only high speed shaft (25) by the oil seal structure 29. The elongated bushing 72 may have a similar or appropriate sealing structure (not shown); for example, such an arrangement as disclosed by the application of C. R. Sacchini, Serial No. 463,745, filed October 29, 1942, now Patent No. 2,376,011 issued May 15, 1942.

We claim:

1. In a motion converter, an external gear, a rotatable annular gear operatively in mesh with and surrounding said external gear, a unidirectionally rotating eccentric shaft drivingly connected to and rotatable with respect to said external gear, a non-rotatable yoke, means slidably guiding the yoke for movement transverse to the axis of the eccentric shaft, said yoke being slidably connected to the external gear in a manner to constrain the movement of said external gear against rotation while enabling movement of the external gear in a circular orbit upon rotation of said eccentric shaft, whereby said annular gear is driven at a relatively slow speed upon rotation of said eccentric shaft.

2. In a motion converter mechanism comprising a housing, a continuously rotating driving member, an eccentric crank pin driven by the driving member, a crosshead in the housing driven by said crank pin with a to and fro motion, an output shaft having a high pitch helical drive thread connection with the crosshead operative to oscillate the shaft, a bearing member for the shaft on the housing, and means connecting the bearing member to the housing and extending inside the housing and slidably engaging the crosshead in a manner to prevent rotation thereof about the axis of the output shaft.

COLUMBUS R. SACCHINI.
LORAIN N. VANDERVOORT.

REFERENCES CITED

The following references are of record in the file of this patent:

UNITED STATES PATENTS

| Number | Name | Date |
| --- | --- | --- |
| 306,375 | Allen | Oct. 14, 1884 |
| 367,340 | Fleak | July 26, 1887 |
| 548,861 | Barter | Oct. 29, 1895 |
| 886,938 | Brush | May 5, 1908 |
| 900,631 | Wilde | Oct. 6, 1908 |
| 1,333,100 | Ruiz | Mar. 9, 1920 |
| 1,831,903 | Chrisman et al. | Nov. 17, 1931 |
| 1,873,380 | Gibson | Aug. 23, 1932 |
| 2,256,055 | Probst | Sept. 16, 1941 |

FOREIGN PATENTS

| Number | Country | Date |
| --- | --- | --- |
| 19,254 | Australia | Sept. 11, 1934 |
| 138,519 | Germany | Feb. 3, 1903 |
| 480,963 | Great Britain | Mar. 2, 1938 |
| 485,969 | Germany | Nov. 7, 1929 |